(12) United States Patent
Wu et al.

(10) Patent No.: US 9,178,557 B2
(45) Date of Patent: Nov. 3, 2015

(54) WIRELESS COMMUNICATION APPARATUS AND ANTENNA SWITCHING METHOD THEREOF

(71) Applicant: HTC Corporation, Taoyuan County (TW)

(72) Inventors: Wei-Yang Wu, Taoyuan County (TW); Tiao-Hsing Tsai, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 3 days.

(21) Appl. No.: 14/144,565

(22) Filed: Dec. 31, 2013

(65) Prior Publication Data

US 2014/0315497 A1    Oct. 23, 2014

Related U.S. Application Data

(60) Provisional application No. 61/813,646, filed on Apr. 19, 2013.

(51) Int. Cl.
*H04B 7/00* (2006.01)
*H04B 1/40* (2015.01)

(52) U.S. Cl.
CPC .......................................... *H04B 1/40* (2013.01)

(58) Field of Classification Search
CPC ..... H04B 7/0814; H04B 7/028; H04B 7/0802
USPC ........................ 455/562.1, 575.7, 97, 129, 269
See application file for complete search history.

(56) References Cited

U.S. PATENT DOCUMENTS

| | | | |
|---|---|---|---|
| 2006/0089107 A1* | 4/2006 | Domino et al. | 455/78 |
| 2008/0106476 A1* | 5/2008 | Tran et al. | 343/702 |
| 2009/0061715 A1* | 3/2009 | Evans | 442/301 |
| 2009/0137218 A1* | 5/2009 | Honda et al. | 455/127.1 |
| 2012/0264473 A1 | 10/2012 | Mujtaba et al. | |
| 2014/0170990 A1* | 6/2014 | Black et al. | 455/73 |

OTHER PUBLICATIONS

"Office Action of Taiwan Counterpart Application," issued on Jun. 29, 2015, p1-p7, in which the listed reference was cited.

* cited by examiner

*Primary Examiner* — Wen Huang
(74) *Attorney, Agent, or Firm* — Jianq Chyun IP Office

(57) ABSTRACT

The invention provides an antenna switching method for a wireless communication apparatus. The wireless communication apparatus includes a first antenna, a second antenna, a first modem, a switch, and a second modem. The first modem generates a control signal; the switch is coupled to the first antenna, the second antenna, the first modem, and the second modem. The switch receives the control signal and performs switching according to the control signal to make the first antenna to be coupled to one of the first modem and the second modem, and to make the second antenna to be coupled to the other one of the first modem and the second modem.

16 Claims, 3 Drawing Sheets

WIRELESS COMMUNICATION APPARATUS AND ANTENNA SWITCHING METHOD THEREOF

CROSS-REFERENCE TO RELATED APPLICATION

The application claims the priority benefits of U.S. provisional application Ser. No. 61/813,646, filed on Apr. 19, 2013. The entirety of the above-mentioned patent application is hereby incorporated by reference herein and made a part of this specification.

BACKGROUND OF THE INVENTION

1. Field of the Invention

The invention relates to a wireless communication apparatus, and more particularly to an antenna switching method for a wireless communication apparatus.

2. Description of Related Art

With advancement in electronic technology, it has become a trend to provide a wireless communication apparatus on an electronic device. Nowadays, with the explosive demands for information, in order to satisfy the demands for receiving various kinds of information, prior art equips the wireless communication apparatus with two modems and two antennas to meet the product requirements.

In prior art, the corresponding relation between the two modems and the antenna is fixed; that is to say, the modem transceives information only via a single corresponding antenna. When the information-transceiving capability of the antenna corresponding to the modem reduces, the capability of the electronic device in transceiving the type of information corresponding to the modem inevitably becomes deteriorated.

SUMMARY OF THE INVENTION

The invention provides a wireless communication apparatus and an antenna switching method thereof, which may switch antennas based on communication quality.

In the invention, the wireless communication apparatus includes a first antenna, a second antenna, a first modem, a second modem, and a switch. The first modem generates a control signal; the switch is coupled to the first antenna, the second antenna, the first modem, and the second modem. The switch receives the control signal and switches based on the control signal, making the first antenna to be coupled to one of the first modem and the second modem, and making the second antenna to be coupled to the other one of the first modem and the second modem.

In an embodiment of the invention, the first antenna receives a first radio-frequency signal; the second antenna receives the second radio-frequency signal. The first modem generates the control signal based on the quality of at least one of the first radio-frequency signal and the second radio-frequency signal.

In an embodiment of the invention, a band of the first radio-frequency signal is at least partially overlapped with a band of the second radio-frequency signal.

In an embodiment of the invention, when the switch makes the first modem to be coupled to the first antenna, the first modem receives the first radio-frequency signal and determines whether the quality of the first radio-frequency signal is greater than a predetermined threshold value to generate the control signal accordingly.

In an embodiment of the invention, when the quality of the first radio-frequency signal is not greater than the predetermined threshold value, the first modem generates the control signal to control the switch, switching the first modem to be coupled to the second antenna.

In an embodiment of invention, the first modem receives the second radio-frequency signal and detects the quality of the second radio-frequency signal; the first modem sets the control signal based on a comparison between the quality of the first radio-frequency signal and the second radio-frequency signal.

In an embodiment of the invention, the wireless communication apparatus further includes a first power amplifier and a second power amplifier. The first power amplifier is coupled between the first modem and the switch. The first power amplifier receives a first enabling signal and turns on or off based on the first enabling signal. The second power amplifier is coupled between the second modem and the switch. The second power amplifier receives a second enabling signal and turns on or off based on the second enabling signal, wherein the first enabling signal and the second enabling signal are generated by the first modem.

In an embodiment of the invention, before the first modem sets the control signal to make the switch to perform switching, the first modem generates the first enabling signal and the second enabling signal to turn off the first and the second power amplifiers, respectively.

In an embodiment of the invention, after the switch completes switching, the first modem enables the first and the second power amplifiers, respectively, via the first enabling signal and the second enabling signal.

In an embodiment of the invention, the wireless communication apparatus further includes a logic operation circuit. The logic operation circuit is coupled between the second modem and the second power amplifier. The logic operation circuit receives the second enabling signal and a third enabling signal, and performs logic operation with respect to the second enabling signal and the third enabling signal to generate a logic operation result. The logic operation result is transmitted to the second power amplifier to enable or stop the second power amplifier.

In the invention, the antenna switching method for the wireless communication apparatus includes: generating the control signal via the first modem, receiving the control signal via the switch which performs switching based on the control signal, making the first antenna to be coupled to one of the first modem and the second modem, and making the second antenna to be coupled to the other one of the first modem and the second modem.

Based on the above, the invention provides the switch to receive the control signal and switches to make the first modem to be coupled to the first antenna and the second modem to be coupled to the second antenna based on the control signal, or to make the first modem to be coupled to the second antenna and the second modem to be coupled to the first antenna. Accordingly, the modem may select the quality of the radio-frequency signals received by the first antenna and the second antenna to switch the antennas, so that the modem may process suitable radio-frequency signal to improve the quality of communication.

In order to make the aforementioned features and advantages of the invention more comprehensible, embodiments accompanying figures are described in detail below.

DESCRIPTION OF EMBODIMENTS

Figure 1:
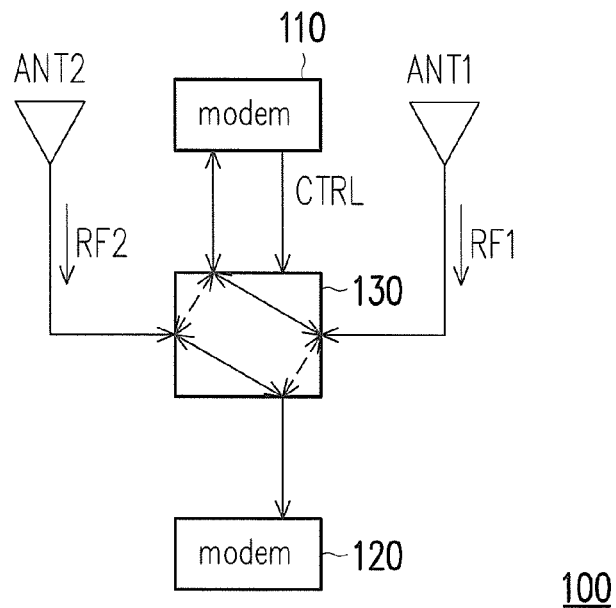
FIG. 1 is a schematic view illustrating a wireless communication apparatus 100 according to an embodiment of the invention.

Please refer to FIG. 1. FIG. 1 is a schematic view illustrating a wireless communication apparatus 100 according to an embodiment of the invention. The wireless communication apparatus 100 includes an antenna ANT1, an antenna ANT2, a modem 110, a modem 120, and a switch 130. The switch 130 is coupled to the antenna ANT1, the antenna ANT2, the modem 110, and the modem 120, wherein the modem 110 generates a control signal CTRL and transmits the control signal CTRL to the switch 130. The switch 130 receives the control signal CTRL and performs switching based on the control signal CTRL. The switch 130 may make the modem 110 to be coupled to the antenna ANT1 based on the control signal CTRL, and make the modem 120 to be coupled to the antenna ANT2. Alternatively, the switch 130 may also make the modem 110 to be coupled to the antenna ANT2 based on the control signal CTRL, and make the modem 120 to be coupled to the antenna ANT1.

In the embodiment, the control signal CTRL may be a digital signal. When the control signal CTRL is in a first logic status (such as a logic high level), the switch 130 may switch to make the modem 110 to be coupled to the antenna ANT1, and make the modem 120 to be coupled to the antenna ANT2. In addition, when the control signal CTRL is in a second logic status (such as a logic low level), the switch 130 may switch to make the modem 110 to be coupled to the antenna ANT2, and make the modem 120 to be coupled to the antenna ANT1.

It should be noted that the modem 110 may generate the control signal CTRL based on at least one of radio-frequency signals RF1 and RF2 received by the antennas ANT1 and ANT2. In terms of the operation details, in the circumstance where the switch 130 makes the modem 110 to be coupled to the antenna ANT1, the modem 110 may receive the radio-frequency signal RF1 via the antenna ANT1. Moreover, the modem 110 may generate the control signal CTRL based on the quality of the radio-frequency signal RF1. If the modem 110 determines that the quality of the radio-frequency signal RF1 is greater than a predetermined threshold value, then it means the radio-frequency signal RF1 is an excellent signal available for use. Accordingly, the modem 110 generates the control signal CTRL to keep the antenna ANT1 coupling to the modem 110 so that the modem 110 may continue receiving and processing the excellent radio-frequency signal RF1. In reverse, if the modem 110 determines that the quality of the radio-frequency signal RF1 is not greater than the predetermined threshold value, then it means that the radio-frequency signal RF1 is not an excellent signal. Therefore, the modem 110 generates the control signal CTRL to make the switch 130 to perform switching to switch the modem 110 to be coupled to the antenna ANT2. Accordingly, the modem 110 may change to receive the radio-frequency signal from the antenna ANT2 for processing.

Further to the above descriptions, after being switched to be coupled to the antenna ANT2, the modem 110 may detect the quality of the radio-frequency signal RF2 received by the antenna ANT2 and compare the quality of the previously received radio-frequency signal RF1 with the quality of the currently received radio-frequency signal RF2, thereby setting the control signal CTRL. Specifically, if the modem 110 determines that the quality of the radio-frequency signal RF2 is better than the quality of the radio-frequency signal RF1, then the modem 110 may generate the control signal CTRL so that the switch 130 keeps making the modem 110 to be coupled to the antenna ANT2. In reverse, if the modem 110 determines that the quality of the radio-frequency signal RF1 is better than the quality of the radio-frequency signal RF2, the modem 110 may generate the control signal CTRL so that the switch 130 performs switching to switch the modem 110 to be coupled to the antenna ANT1.

By the way, when the modem 110 is coupled to the antenna ANT1, the modem 120 is coupled to the antenna ANT2. For design, take a handheld electronic device as an example, the modem 110 may be used for processing a voice signal, and the modem 120 may be used for processing a network signal. In other words, the modem 110 is used for processing the radio-frequency signal that requires better signal quality, and the modem 120 is used for processing the radio-frequency signal of which the quality may be lower.

Figure 2A:
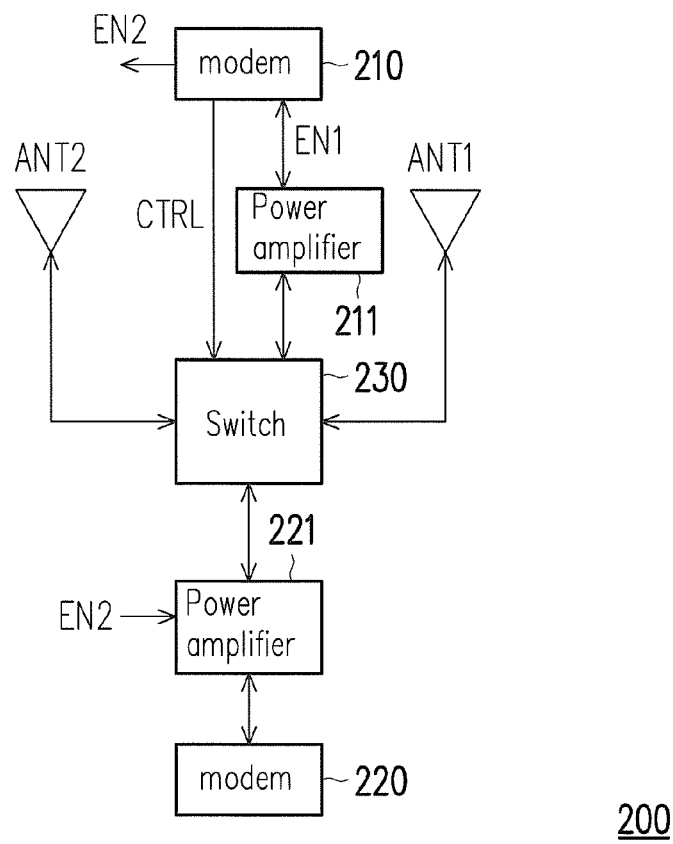
FIG. 2A is a schematic view illustrating a wireless communication apparatus 200 according to another embodiment of the invention.

Please refer to FIG. 2A. FIG. 2A is a schematic view illustrating a wireless communication apparatus 200 according to another embodiment of the invention. In FIG. 2A, a wireless communication apparatus 200 includes a modem 210, a modem 220, a switch 230, a power amplifier 211, a power amplifier 221, and an antenna ANT1 and an antenna ANT2. The switch 230 is coupled among the modems 210, 220 and the antennas ANT1, ANT2. The power amplifier 211 is coupled between the switch 230 and the modem 210, and the power amplifier 221 is coupled between the switch 230 and the modem 220.

In the embodiment, the power amplifier 211 amplifies the signal to be transceived with respect to the modem 210, and transmits the amplified transceiving signal to the switch 230 or the modem 210. In addition, the modem 210 transmits an enabling signal EN1 to the power amplifier 211. The power amplifier 211 enables or stops the amplification of the signal based on the received enabling signal EN1.

On the other hand, the power amplifier 221 amplifies the signal to be transceived with respect to the modem 220 and transmits the amplified transceiving signal to the switch 230 or the modem 220. Moreover, the modem 210 transmits an enabling signal EN2 to the power amplifier 221. The power amplifier 221 enables or stops the amplification of the signal based on the received enabling signal EN2.

Please note that, if the power amplifier 211 and the power amplifier 221 keeps operating and outputting the amplified transceiving signal during the process where the switch 230 performs switching, it is conceivable that, when the switch of the switch 230 operates, the residual discharge of the parasitic capacitance within the switch 230 is likely to cause a great voltage difference to be generated instantly between output ends of the power amplifier 211 and the power amplifier 221, which may cause high current to be generated instantly between the switch 230 and the output ends of the amplifiers 211 and 221 or even cause sparks, which is likely to lead to the damage to the element within the wireless communication apparatus 200.

In view of the above, before transmitting the control signal CTRL to drive the switch 230 to perform switching, the modem 210 in the embodiment may transmit the enabling signals EN1 and EN2 respectively to the power amplifiers 211 and 221, and stop the operations of the power amplifiers 211 and 221 respectively via the enabling signals EN1 and EN2. Furthermore, after the switch 230 completes switching, the modem 210 may enable the operations of the power amplifiers 211 and 221 respectively again via the enabling signals EN1 and EN2 so as to maintain normal operation of the wireless communication apparatus 200.

Here, the modem 210 may make the amplifiers 211 and 221 to resume operating through changing the enabling signals EN1 and EN2 after a fixed predetermined time segment following setting the control signal CTRL to drive the switch 230 to perform switching. The predetermined time segment may be set according to the time required for the switch 230 to complete switching.

Figure 2B:
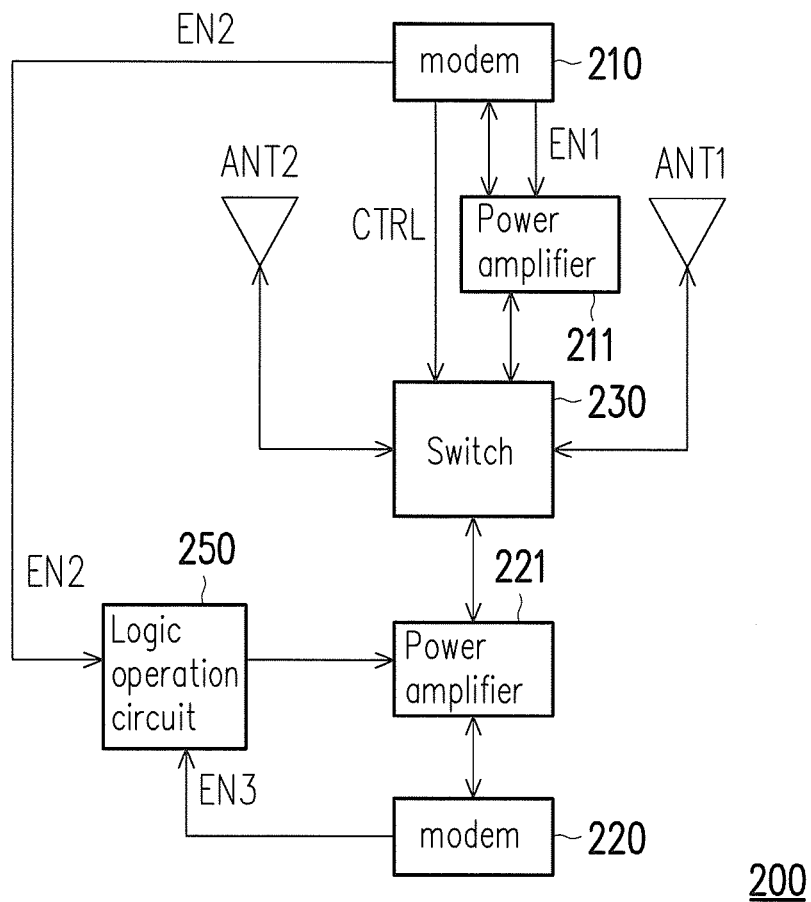
FIG. 2B is a schematic view illustrating another implementation of the embodiment for the wireless communication apparatus 200 of the invention.

Please refer to FIG. 2B. FIG. 2B is a schematic view illustrating another implementation of the embodiment for the wireless communication apparatus 200 of the invention, wherein the wireless communication apparatus 200 further includes a logic operation circuit 250. The logic operation circuit 250 is coupled among the modems 210, 220 and the power amplifier 221. To make the power amplifier 221 to be controlled with priority by the modem 210, the logic operation circuit 250 is configured to receive the enabling signal EN2 transmitted by the modem 210 and the enabling signal EN3 transmitted by the modem 220. Meanwhile, the logic operation circuit 250 performs logic operation with respect to the enabling signal EN2 and the enabling signal EN3, and uses the logic operation result obtained from the operation to control the power amplifier 221 to turn on or off.

It should be noted that the modem 210 and the modem 220 may control the power amplifier 221 to turn on or off via the enabling signals EN2 and EN3, respectively. The enabling signal EN2 transmitted by the modem 210 in controlling the power amplifier 221 to turn on or off has higher priority than the enabling signal EN3 transmitted by the modem 220. Specifically, that is to say, in the circumstance where the enabling signal EN2 transmitted by the modem 210 instructs to control the power amplifier 221 to turn off, no matter what enabling signal EN3 is transmitted by the modem 220, the power amplifier 221 does not change to become turned on. In addition, in the circumstance where the enabling signal EN2 transmitted by the modem 210 instructs to control the power amplifier 221 to be turned on, the modem 220 may control the power amplifier 221 to turn on or off via the enabling signal EN3.

In the above embodiments, in the circumstance where the switch 230 of the wireless communication apparatus 200 performs switching, the modem 210 takes over the controlling action to control the power amplifiers 211 and 221 to turn on or off. In reverse, in the circumstance where the switch 230 is not required to perform switching, the modems 210 and 220 may respectively control the corresponding power amplifiers 211 and 221 to turn on or off. In other words, at that time, the modem 220 may directly transmit the enabling signal EN3 via the logic operation circuit 250 to control the power amplifier 221 to turn on or off.

Figure 3:
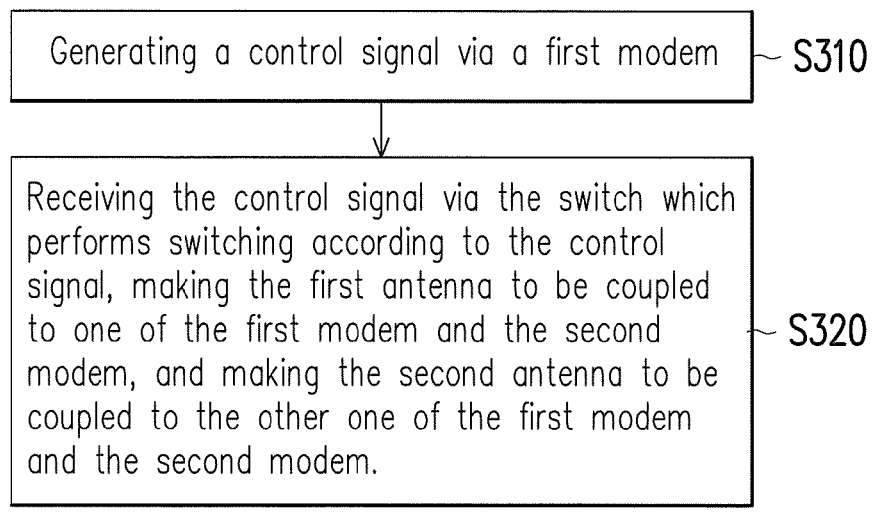
FIG. 3 is a flowchart illustrating an embodiment for an antenna switching method for a wireless communication apparatus of the invention.

Please refer to FIG. 3. FIG. 3 is a flowchart illustrating an embodiment for an antenna switching method for the wireless communication apparatus of the invention. The antenna switching method for the wireless communication apparatus includes the following steps: in step S310, generating the control signal via the first modem; in step S320, receiving the control signal via the switch, and making the first antenna to be coupled to one of the first modem and the second modem and making the second antenna to be coupled to the other one of the first modem and the second modem via the switching action performed by the switch according to the control signal. Specifically, the switch makes the first antenna to be coupled to the first modem (at the time, the second antenna is coupled to the second modem), or makes the second antenna to be coupled to the first modem (at the time, the first antenna is coupled to the second modem) according to the control signal.

Figure 4:
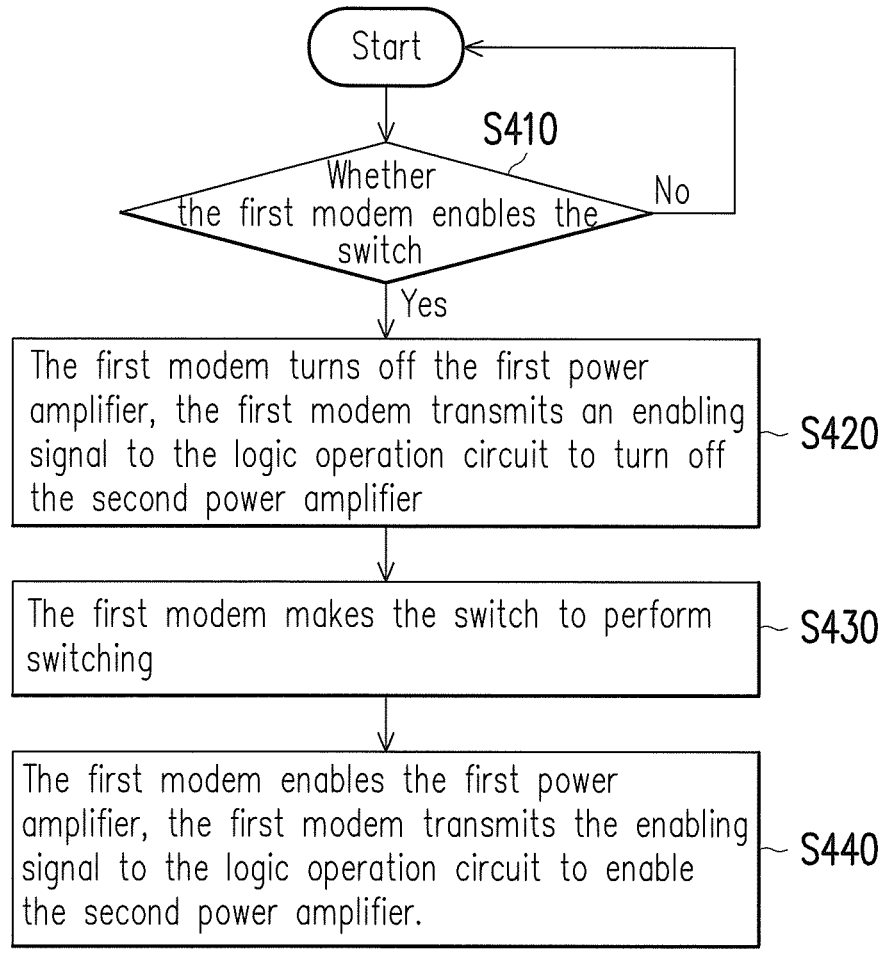
FIG. 4 is a flowchart illustrating the implementation details of the antenna switching method for the wireless communication apparatus according to an embodiment of the invention.

Please refer to FIG. 4. FIG. 4 is a flowchart illustrating the implementation details of the antenna switching method for the wireless communication apparatus according to an embodiment of the invention. In step S410, with respect to whether the first modem enables the switch to perform switching via the control signal, if the determining result in step S410 is negative, then the determining step is continued to be carried out; in reverse, if the determining result in step S410 is positive, then step S420 is carried out to make the first modem to turn off the first power amplifier. Moreover, the first modem transmits the enabling signal to the logic operation circuit to turn off the second power amplifier. Thereafter, in step S430, the first modem makes the switch to perform switching; in step S440, when the switch completes switching, the first modem re-enables the first power amplifier and enables the second power amplifier via the enabling signal transmitted to the logic operation circuit.

Based on the above, in the invention, by providing a switch among the first modem, the second modem, the first antenna, and the second antenna, and using the first modem to transmit the control signal to control the switching of the switch, the first modem may select to receive the radio-frequency signal received by the first antenna or the second antenna to maintain the best communication quality of the wireless communication apparatus.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A wireless communication apparatus, comprising:
   a first antenna;
   a second antenna;
   a first modem, generating a control signal;
   a second modem;
   a switch, coupled to the first antenna, the second antenna, the first modem and the second modem, the switch receiving the control signal and performing switching according to the control signal, making the first antenna to be coupled to one of the first modem and the second modem, and making the second antenna to be coupled to the other one of the first modem and the second modem;
   a first power amplifier, coupled between the first modem and the switch, the first power amplifier receiving a first enabling signal to turn on or off according to the first enabling signal; and
   a second power amplifier, coupled between the second modem and the switch, the second power amplifier receiving a second enabling signal to turn on or off according to the second enabling signal, wherein the first enabling signal and the second enabling signal are generated by the first modem,
   wherein the second enabling signal has a higher priority than the third enabling signal, when both of the first and second modems are keeping running, the second enabling signal instructs to stop the second power amplifier and the second power amplifier is stopped regardless whether the third enabling signal is enabled or not.

2. The wireless communication apparatus according to claim 1, wherein the first antenna receives a first radio-frequency signal, the second antenna receives a second radio-frequency signal, the first modem generates the control signal according to quality of at least one of the first radio-frequency signal and the second radio-frequency signal.

3. The wireless communication apparatus according to claim 2, wherein a band of the first radio-frequency signal is at least partially overlapped with a band of the second radio-frequency signal.

4. The wireless communication apparatus according to claim 2, wherein when the switch makes the first modem to be coupled to the first antenna, the first modem receives the first radio-frequency signal the determines whether the quality of the first radio-frequency signal is greater than a predetermined threshold value to generate the control signal.

5. The wireless communication apparatus according to claim 4, wherein when the quality of the first radio-frequency signal is not greater than the predetermined threshold value, the first modem generates the control signal to control the switch to switch the first modem to be coupled to the second antenna.

6. The wireless communication apparatus according to claim 5, wherein the first modem receives the second radio-frequency signal and detects the quality of the second radio-frequency signal, and the first modem sets the control signal based on a comparison between the quality of the first radio-frequency signal and the quality of the second radio-frequency signal.

7. The wireless communication apparatus according to claim 1, wherein before the first modem sets the control signal to make the switch to perform switching, the first modem generates the first enabling signal and the second enabling signal to turn off the first power amplifier and the second power amplifier, respectively.

8. The wireless communication apparatus according to claim 7, wherein the first amplifier enables the first power amplifier and the second power amplifier respectively via the first enabling signal and the second enabling signal after the switch completes switching.

9. The wireless communication apparatus according to claim 1, further comprising a logic operation circuit coupled between the second modem and the second power amplifier, the logic operation circuit receiving the second enabling signal and a third enabling signal, and performing a logic operation with respect to the second enabling signal and the third enabling signal to generate a logic operation result, the logic operation result being transmitted to the second power amplifier to enable or stop the second power amplifier.

10. An antenna switching method for a wireless communication apparatus, comprising:
  generating a control signal via a first modem;
  receiving the control signal via a switch which performs a switching action according to the control signal, making a first antenna to be coupled to one of the first modem and a second modem, and making a second antenna to be coupled to the other one of the first modem and the second modem;
  before the switch performs switching according to the control signal, generating the first enabling signal and the second enabling signal to respectively turn off a first power amplifier and a second power amplifier via the first modem, wherein the first power amplifier is coupled to the first modem, and the second power amplifier is coupled to the second modem; and
  after the switch completes switching, enabling the first power amplifier and the second power amplifier respectively by the first modem via the first enabling signal and the second enabling signal,
  wherein, when both of the first and second modems are keeping running, the second enabling signal instructs to stop the second power amplifier, and the second power amplifier is stopped regardless whether the third enabling signal is enabled or not.

11. The antenna switching method for the wireless communication apparatus according to claim 10, the control signal being generated by the first modem according to quality of at least one of a first radio-frequency signal and a second radio-frequency signal,
  wherein the first radio-frequency signal and the second radio-frequency signal are respectively received by the first antenna and the second antenna.

12. The antenna switching method for the wireless communication apparatus according to claim 11, wherein a band of the first radio-frequency signal is at least partially overlapped with a band of the second radio-frequency signal.

13. The antenna switching method for the wireless communication apparatus according to claim 11, wherein the step of generating the control signal by the first modem according to the quality of at least one of the first radio-frequency signal and the second radio-frequency signal comprises a step of:
  when the switch makes the first modem to be coupled to the first antenna, receiving the first radio-frequency signal and determining whether the quality of the first radio-frequency signal is greater than a predetermined threshold value via the first modem to generate the control signal.

14. The antenna switching method for the wireless communication apparatus according to claim 11, wherein the step of receiving the first radio-frequency signal and determining whether the quality of the first radio-frequency signal is greater than the predetermined threshold value via the first modem to generate the control signal comprises a step of:
  when the quality of the first radio-frequency signal is not greater than the predetermined threshold value, generating the control signal to control the switch to switch the first modem to be coupled to the second antenna via the first modem.

15. The antenna switching method for the wireless communication apparatus according to claim 14, further comprising steps of:
  receiving the second radio-frequency signal and detecting the quality of the second radio-frequency signal via the first modem, and setting the control signal by the first modem according to a comparison between the quality of the first radio-frequency signal and the quality of the second radio-frequency signal.

16. The antenna switching method for the wireless communication apparatus according to claim 10, further comprising a step of:
  after the switch completes switching, enabling the first power amplifier and the second power amplifier respectively by the first modem via the first enabling signal and the second enabling signal.

* * * * *